S. M. SCHENKEIN.
GEM POLISHING MACHINE.
APPLICATION FILED JUNE 7, 1911. RENEWED FEB. 17, 1915.

1,132,882.

Patented Mar. 23, 1915.
8 SHEETS—SHEET 5.

Attest:

Samuel M. Schenkein, Inventor:
by William R. Baird
his Atty

S. M. SCHENKEIN.
GEM POLISHING MACHINE.
APPLICATION FILED JUNE 7, 1911. RENEWED FEB. 17, 1915.

1,132,882.

Patented Mar. 23, 1915.

Attest:
Edgeworth Greene
Alan C. McDonnell

Samuel M. Schenkein, Inventor:
by William R. Baird
his Att'y.

S. M. SCHENKEIN.
GEM POLISHING MACHINE.
APPLICATION FILED JUNE 7, 1911. RENEWED FEB. 17, 1915.

1,132,882.

Patented Mar. 23, 1915.
8 SHEETS—SHEET 7.

Attest:
Edgeworth Greene
Alan C. McDonnell

Samuel M. Schenkein, Inventor:
by William R. Baird
his Atty

UNITED STATES PATENT OFFICE.

SAMUEL M. SCHENKEIN, OF NEW YORK, N. Y.

GEM-POLISHING MACHINE.

1,132,882.  Specification of Letters Patent.  Patented Mar. 23, 1915.

Application filed June 7, 1911, Serial No. 631,747. Renewed February 17, 1915. Serial No. 8,888.

*To all whom it may concern:*

Be it known that I, SAMUEL M. SCHENKEIN, a citizen of the United States, residing at New York, in the county of New York and State of New York, have invented certain new and useful Improvements in Gem-Polishing Machines, of which the following is a specification.

This invention relates to the polishing of diamonds and other gems and its novelty consists in the successive steps of the process employed, in the manner and method of manipulating the instrument used, and in the construction and adaptation of the parts of the said instrument.

In general the invention relates to a novel instrument for holding and manipulating the gem, and which instrument comprises a dop of novel construction, both as to its construction and mode of use, and a dop carrier, of novel construction with sundry adjuncts and appliances, as will be hereinafter described.

The purposes of the invention are, first, to provide means by which the gem to be polished is firmly and securely seated in the dop without tendency to turn, twist or tilt while being so placed and afterward; secondly, to provide means whereby the gem is firmly held in the dop by a retaining device which is not brought into dangerous proximity to any one of its thin angular edges; thirdly, to provide means whereby the dop may be accurately placed and held in any proper angular position with respect to the polishing wheel and reinstated in any such position after displacement therefrom, and fourthly, to provide means whereby the dop can be moved to bring the grain of the stone into proper relation to the wheel without disturbing the other adjustments of the instrument; the whole operation being carried out with an unusual economy of time, skill and effort.

Means are also provided to remove the stone from the dop without any danger of injury.

In the following description diamonds are described as the gems to be polished, although it will of course be understood that any gem capable of being subjected to similar treatment may be operated upon in the described manner. Also that in speaking of diamonds the word "polishing" implies the production of a plane surface and is not restricted merely to a burnishing operation.

In the drawings, Figure 1 is a side elevation of an instrument embodying some of the elements of the invention, different positions of the parts being indicated in dotted outline; Fig. 1ª is a sectional view of a weight; Fig. 21* is a detail showing the engagement of the gem retainer and pot holder; Fig. 29 is a side elevation of the same and Fig. 30 is a bottom view thereof.

In the drawings, 50, represents a bench, or table, of any suitable form or material on which is mounted to revolve in suitable bearings (not shown), a polishing wheel 51 made in the usual manner. The bench is also provided with positioning posts indicated at 52. These are of a form common to the art, are adjustable with respect to the wheel and arranged in the usual manner and need no particular description to those skilled in the art.

A dop carrier 60 comprises an arm 61 having at one end two depending brackets 62, 62 and a clamp 63 and at the other end a dop holder and dop as will be hereinafter described. The brackets 62 are each apertured to receive a sleeve 64 which also passes through an aperture in the clamp 63. Two disks 65, 65 are each provided with a shaft 66 eccentrically secured thereto and projecting therefrom and these shafts are placed within the sleeve 64 so that they do not quite meet at its center. Two pins 67, 67 are adapted to secure the shafts within the sleeve after they have been put in position therein. A saucer spring 68 loosely mounted on each shaft 66 is placed between each disk and the bracket to which it is adjacent. In assembling the parts, the shaft 66 is inserted in the sleeve 64 until a hole therein registers with a hole in the sleeve and the pin 67 can be inserted through both holes to secure the shaft and sleeve together. When the shaft is so placed, the spring 68 is compressed and thereafter the disk, the shaft and the sleeve will move together as a unit and the disk will turn against the tension of the spring and after so turning will remain in the position to which it has been rotated. By the described means the carrier 60 may be raised and lowered to any position within the limits of the construction of the described parts by rotating the disks 65, the tension of the spring 68 keeping the parts from accidental displacement after each such adjustment. A holder 650 may be provided on each disk to facilitate its rotation. As a further precaution, and in order to be sure that the carrier is to be maintained at the position to which it has been set, the clamp 63 is split as indicated at 69 and a thumb screw 70 is adapted to pass through an unthreaded aperture in one of its members 71 and a threaded aperture in the other of its members 72, a head 73 being adapted to bear against the member 71 to draw the two members 71 and 72 together when the screw is rotated and thus to clamp the sleeve 64 firmly against rotation.

Each bracket 62 is provided with a projecting pin 74 adapted to engage a curved slot 75 formed in each one of the disks 65. This slot is so arranged that when the disk is rotated in one direction, and the carrier is at its highest level, the pin 74 will engage one end of the slot and when the disk is rotated in the opposite direction, and the carrier is consequently at its lowest level, the pin 74 will engage the opposite end of the same slot.

The carrier 60 is provided with a level indicated at 76 and with a removable tail rod 77 threaded to engage a threaded bushing 78 formed in the carrier. This tail rod coöperating with the arm 61 and with the positioning posts 52 serves to maintain the entire carrier in any desired position against lateral displacement after it has once been set into such position. The carrier is also provided at suitable places with holders 79 adapted to carry weights indicated at 790, 790 to counterbalance the carrier when required.

The dop proper comprises a pot, a pot holder, a gem retainer, for holding the gem while it is being operated upon and various instrumentalities connected therewith, as will presently be described.

80 is the pot holder consisting of a base 81, a cylindrical flange 82 externally threaded at 83, and a spherical head 84, the latter having a diametrical aperture adapted to receive a shaft 120, presently to be described.

90 is a hollow cylindrical pot provided with a projecting neck 91 having a beveled recess 92 in which the gem to be operated upon is inserted. The pot is adapted to rest within the circular flange 82 and against a shoulder 93 formed in the base 81 of the pot holder 80. A longitudinal aperture indicated at 94 leads from the bottom of the recess 92 to the hollow interior of the pot 90. A space 95 is left between the bottom of the pot and the base 81 of the holder to catch any foreign matter which may perchance get inside the pot at any time.

Figures 5, 6, 7, 8, 9:
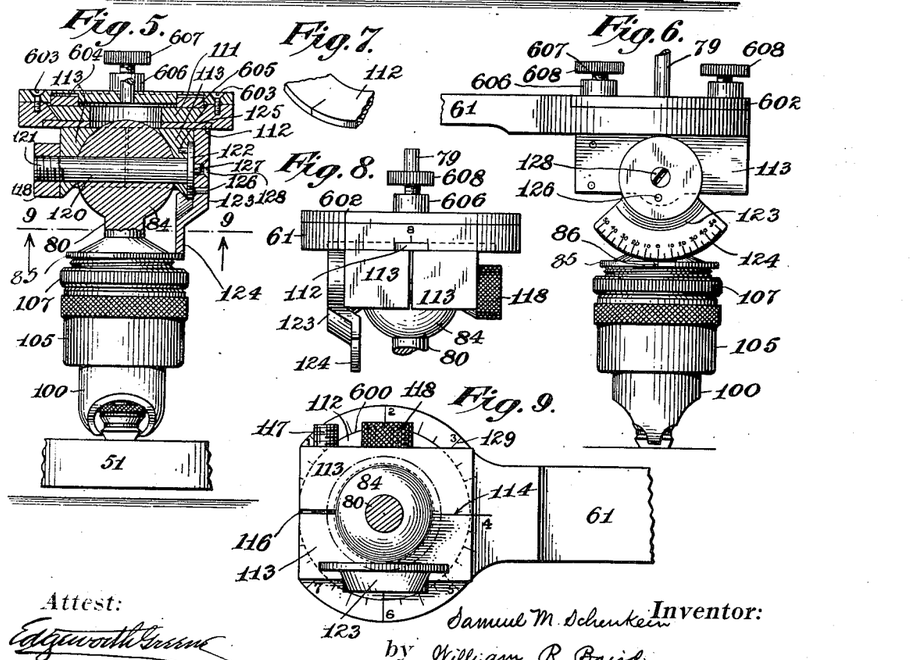
Fig. 5 is a central vertical section on the plane of the line 5—5 in Fig. 1.
Fig. 6 is a side elevation of the parts shown in Fig. 5 looking toward the left.
Fig. 7 is a perspective detail of a part of the supporting plate for the clamping blocks.
Fig. 8 is an end elevation of the parts of the dop clamp shown in Fig. 6 with the lower parts removed.
Fig. 9 is a bottom plan view of the parts shown in Fig. 5 above the plane of the line 9—9 in Fig. 5.
Figure 10:
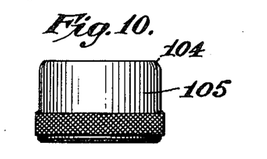
Fig. 10 is a side elevation of the dop sleeve nut.

100 is the gem retainer consisting of a sleeve 101 closely surrounding the pot 90 and projecting beyond the neck 91 and provided with two inwardly curving grips 102, 102 adapted to engage the gem to be operated upon. The sleeve 101 is provided with an annular flange 103 adapted to be engaged by a flange 104 of a sleeve nut 105 internally threaded at 106 to engage the threads 83 on the pot holder 80. An annular lock nut 107, which is also adapted to engage the same threads 83 on the pot holder 80, when moved against the sleeve nut, 105, holds the latter, and consequently the retainer 100, firmly in position. An annular flange 85 on the pot holder 80 serves to limit the movement of the nut 107. The pot holder is also provided with a niche or graduation indicated at 86 (see Fig. 6) which coöperates with a scale 123 presently to be described.

Figure 11:
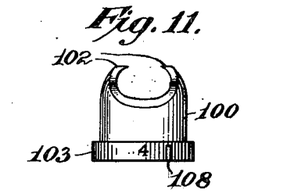
Fig. 11 is a side elevation of the gem retainer.
Figure 12:
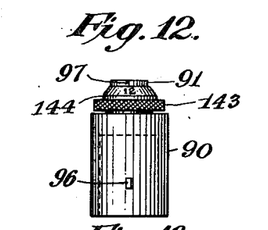
Fig. 12 is a side elevation of the pot.
Figures 13, 14, 18, 19, 20, 21:
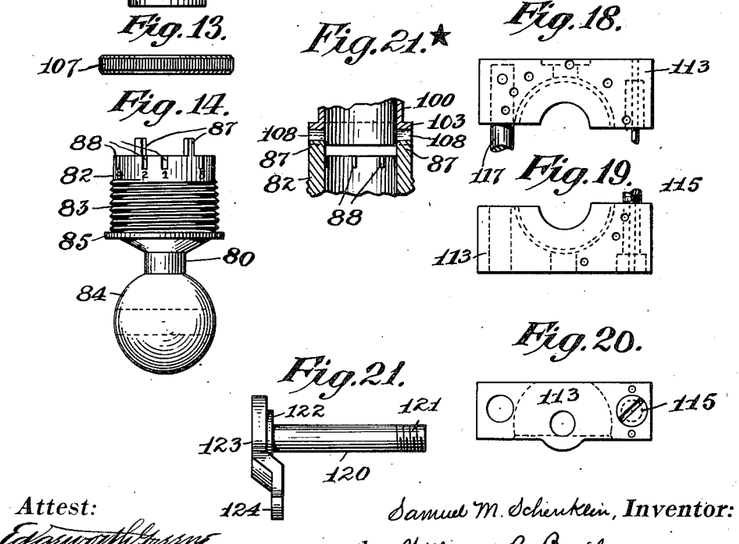
Fig. 13 is a side elevation of the locking nut and Fig. 14 is a side elevation of the pot holder.
Figs. 18 and 19 are plan views of the pot holder clamping blocks.
Fig. 20 is a side elevation of the block shown in Fig. 19.
Fig. 21 is a side elevation of the removable shaft of the pot holder.
Figure 15:
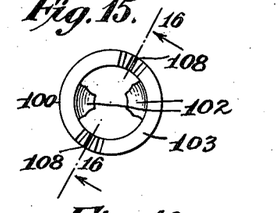
Fig. 15 is a plan view of the gem retainer.
Figure 16:
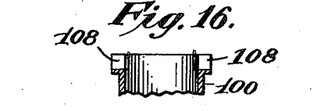
Fig. 16 is a section thereof on the plane of the line 16—16 in Fig. 15.
Figure 17:
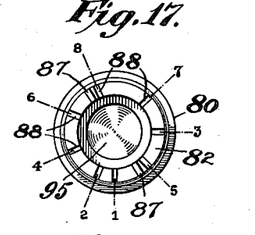
Fig. 17 is a bottom view of the parts shown in Fig. 14.
Figure 22:
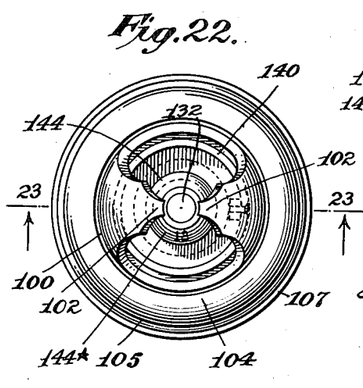
Fig. 22 is a bottom view of the assembled dop on an enlarged scale.

The flange 103 of the retainer 100 is provided with one or more recesses 108 (see Fig. 11) adapted to receive lugs 87 (see Fig. 14) projecting from the pot holder 80. The pot 90 is provided with a projecting lug 96 (see Fig. 12) adapted to engage any one of a number of slots 88 (see Fig. 17) formed in the edge of the cylindrical flange 82 of the pot holder 80. These slots 88 are designated by numbers (see Figs. 14 and 17) whereby the position of the pot when moved circularly can be accurately ascertained and it can always be brought to a position corresponding to the particular facets of the gem to be operated upon. On the outer surface of the neck 91 there is placed a niche or graduation indicated at 97 (see Fig. 12) adapted to assist in placing the gem into a desired position.

Figures 1, 1A:
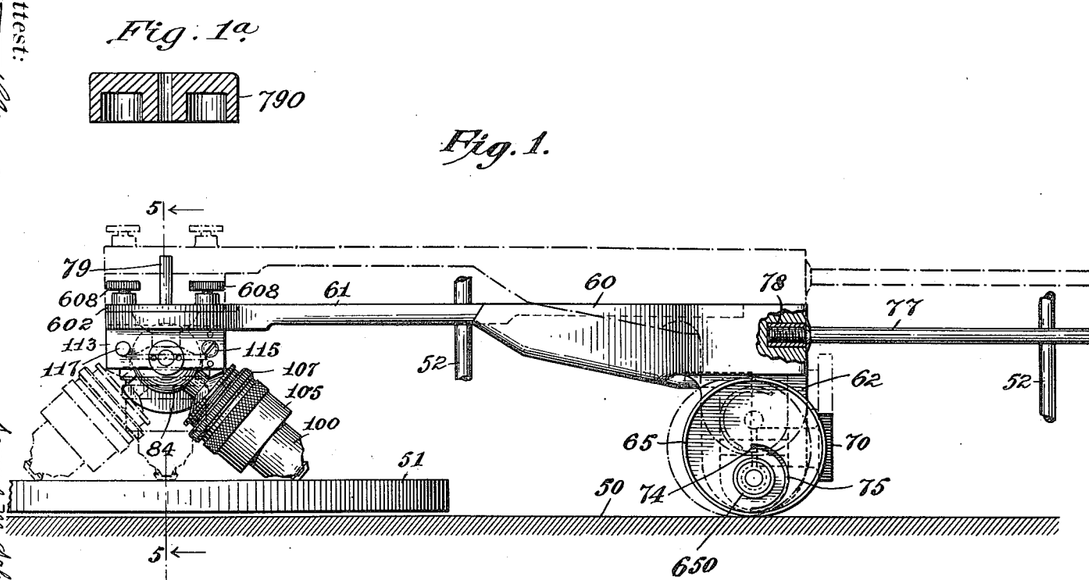

The means provided for securing the dop to the carrier are as follows:—A circular aperture with downwardly beveled sides 110 is formed within the carrier at a suitable place and is adapted to receive an annular frustum of a cone 111. Beneath this, and secured thereto by screws, or other suitable means, is a circular plate 112 extending beyond the periphery of the cone 111 and adapted to move in a circular recess 600 formed in the lower part of the arm 61. Secured beneath this plate 112 are two clamping blocks 113, 113 centrally recessed to receive the spherical head 84 of the pot holder. On one side of this spherical head at 114, the blocks are in contact and are secured together by a screw 115 (see Figs. 1, 19 and 20). On the other side of the spherical head, the blocks are slightly separated as indicated at 116 (see Fig. 9) to permit of the movement of the sphere within its recess and on that side the blocks are moved together by means of a clamp screw 117 secured within a threaded aperture in one of the blocks and passing through the other and the threaded end of which screw is adapted to be engaged by a nut 118 which is also adapted to be secured to the threaded end of the shaft 120. The arm 61 is provided at its upper side with a circular recess indicated at 601 and adapted to receive a cover plate 602 secured in place by screws 603. It is provided with an annular recess 604 in which is a ring 605. It is also provided with upwardly extending bosses 606 internally threaded and adapted to receive set screws 607 having knurled tops 608. By the rotation of these screws 607 the parts described and the blocks 113 are rigidly held against the arm 61. A shaft 120 provided at one end with threads 121 and at the opposite end with a plate 122 is secured within the blocks 113 and passes loosely through the spherical head 84. To the plate 122 is secured a sector 123 suitably graduated as indicated at 124 (see Fig. 6). One of the blocks 113 is provided with one or more pins 125 (see Fig. 5) adapted to be inserted in suitable apertures formed in the plate 122 to accurately position the latter. The sector 123 is also provided with an inwardly projecting pin 126 (see Fig. 5) adapted to be inserted in another aperture in the plate 122. A boss 127 is formed on the outer side of the plate 122 and is internally threaded to receive a screw 128 which is countersunk into the sector 123 to hold the latter in place. It will be understood that the shaft 120, the plate 122, and the boss 127 are preferably all made integral. A nut 118 is adapted to be secured to the end of the shaft 120 opposite the plate 122 and this same nut is also employed to secure the shaft 117 in position. The lower surface of the arm 61 is provided with suitable graduations indicated at 129.

Figure 23:
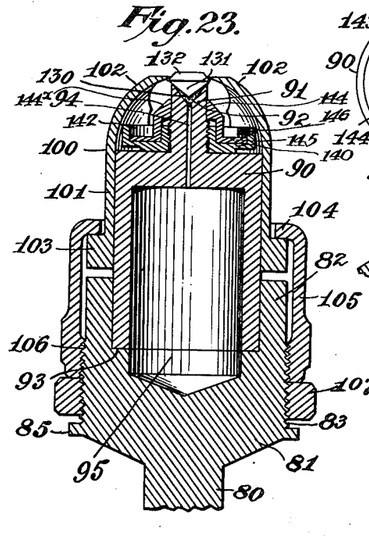
Fig. 23 is a central vertical section of the same on the plane of the line 23—23 in Fig. 22 showing the gem to be operated on in place.
Figures 24, 26, 27:
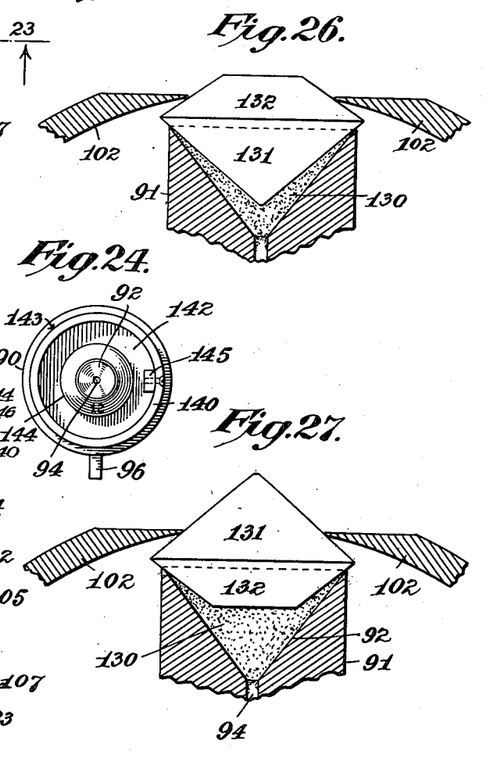
Fig. 24 is a bottom view of the pot.
Fig. 26 is an enlarged section of the neck of the pot and the gem retainer showing the gem in place with the pavilion of the gem in the neck recess.
Fig. 27 is a view of the parts shown in Fig. 26 with the gem reversed.
Figure 25:
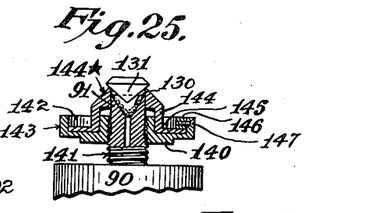
Fig. 25 is a detail of the end of the pot and the gem remover.

The gem to be polished is placed within the recess at the end of the pot upon a bed of cement 130, either the pavilion 131 being placed against the cement (see Fig. 26) or the crown 132 being so placed (see Fig. 27). The means for accurately seating the gem in the neck of the pot are hereinafter described. After the polishing operation the gem must be removed from the pot and for that purpose an ejector is employed. This comprises a nut 140 having a central aperture internally threaded to engage threads 141 formed on the base of the neck 91 of the pot 90 (see Figs. 23 and 25). This nut is provided with an annular recess 142 and its outer cylindrical surface is knurled as indicated at 143, Fig. 12. A sleeve 144, the inner surface of which contacts with the outer surface of the neck 91, surrounds the neck. It is provided with an external bevel 144* so that its edge which comes into contact with the under surface of the gem is fine and presents a small area of contact therewith. This sleeve has a projecting annular flange 145 which seats within the recess 142 and is held in position by a block 146 which rests against the flange and is in turn held in position by a screw 147 passing through the wall of the recess 142 in the nut 140.

In Figs. 33 to 37, are shown views of the positioner employed for placing the gem in the pot in a proper position for the polishing operation. It is obvious that a gem to be polished may be placed in the neck of the pot by hand by a skilful operator. But experience has demonstrated that no operator is skilful enough always to perform this important function properly, so I have provided mechanical means for accomplishing it. The means which I prefer comprises a base plate 200 provided with pointed feet 201, 201 and with an upwardly projecting central cylindrical boss 202 constituting a positioner and adapted to receive the flange of the pot 90 which is adapted to embrace it. Springing upwardly from the base 200 is a bracket 203 provided with an aperture threaded at its upper part and adapted to receive at such part a presser screw 204 having a knurled head 205. A presser rod 206 fits snugly within the smooth lower part of the bracket aperture beneath the screw 204. The center of the boss 202, the longitudinal axis of the pot and the center lines of the screw 204 and rod 206 should all be in accurate alinement.

Figure 34:
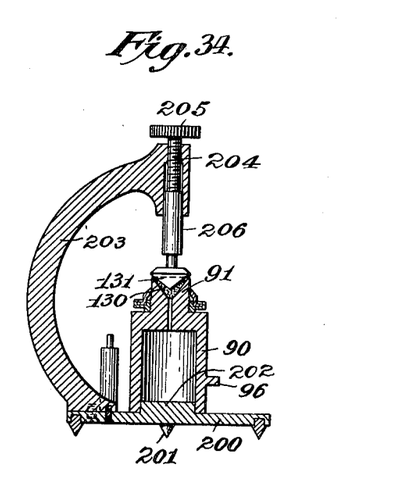
Fig. 34 is a central section thereof on the plane of the line 34—34 in Fig. 36.
Figure 35:
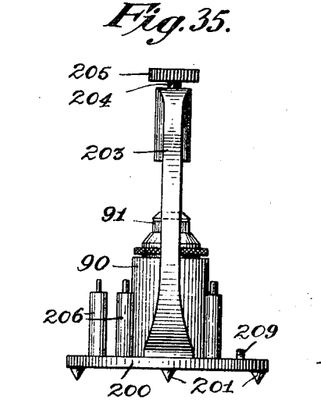
Fig. 35 is a rear elevation of the same and Fig. 36 is a plan view thereof.
Figure 36:
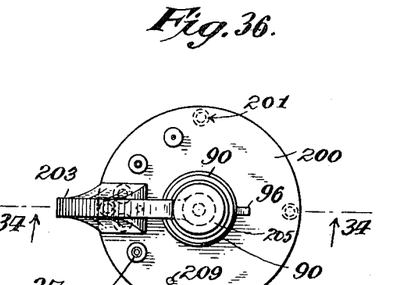
Figures 37, 38:
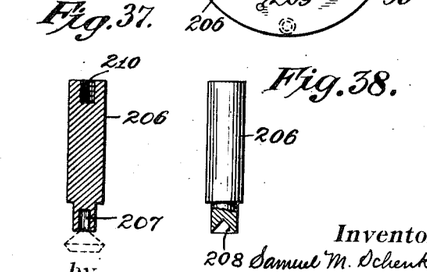
Fig. 37 is a detail of the section of the presser rod.
Fig. 38 is a view, partly in section, showing a modified form of end of the pressure rod.

When the gem is to be placed in the pot the recess at the end of the neck is first filled with cement to a proper depth indicated at 130. The gem is then put into position for instance with the table uppermost (as shown in Fig. 34) and the presser screw advanced until the rod 206 contacts with the table of the gem and gently but firmly seats the gem in the cement. It is then held in such relation until the cement hardens. When the gem is seated with the table next to the cement and the culet is uppermost another form of presser rod is used as shown in Fig. 37. In this form, a recess 207 is formed at the one end of the rod to embrace the gem. Such recess may be of any suitable shape to conform closely to the shape of the gem, for instance, the sides of the recess may be beveled as shown at 208. A whole series of presser rods of different diameters and forms, as shown in Figs. 35 and 36, may be employed with the same base plate and bracket and presser screw; and, in the same way, pots having necks of different sizes may be employed with the same positioners so long as the internal diameter of the annular flange of the pot 90 remains the same. The base 200 is provided with upwardly projecting threaded studs 209 and each rod is provided with a threaded recess 210 so that the rods may be mounted on the studs and thus kept from being lost.

Figure 29:
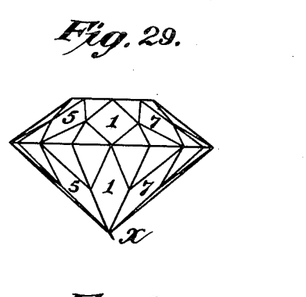

The mode of using the instrument is as follows: The gem to be polished is first inserted in the pot by means of the positioner just described. Usually with the devices now in use in the art when a diamond is to be polished, the crown is polished first, but I prefer to polish the pavilion first because the crown being more shallow is more readily held in the pot while its surface is unpolished. The pot in which the gem has been inserted pavilion outward must first be placed in the dop. To that end the instrument is turned upside down and the pot 90 is set in the holder 80 so that its lug 96 drops into that one of the slots which is marked "1". This is because it is preferable first to polish the culet or small terminal facet at the end of the pavilion and which is marked "$x$" in Figs. 29, 30 and 32, and to secure this the dop should be placed in the carrier in such a position that its longitudinal axis is at right angles to the carrier arm 61 and the wheel 51. But as two of the oppositely disposed prime facets of the pavilion are next to be polished and as the dop for that purpose needs no circular adjustment the pot can be set in the position to polish these two facets in the first instance and it will also be in position to polish the culet, so the pot is so placed that its lug 96 drops into the slot marked "1" in order that the facets marked "1," "1" (see Fig. 32) may be polished. The lock nut 107 is then placed over the threads 83 until it rests against the flange 85. The gem retainer 100 is then slowly and gently put in position over the pot and moved until the grips 102 come into contact with the surface of the gem. When this is done, the slots 108 should engage the projections 87 on the flange 82 of the holder 80 (see Fig. 21*). To assist in this adjustment, a numeral which is cut on the surface of the retainer 100 to designate the size of the retainer (for instance the numeral "4" in Fig. 11) is always turned opposite that one of the slots 88 designated "1" and this always brings the exposed part of the stone between the grips on one side of the cutting plane. The sleeve nut 105 is then placed in position over the retainer 100 and its flange 104 engages the flanges 103 of the latter. The sleeve nut is then rotated and its threads 106 caused to engage the threads 83 of the pot holder. The pot is prevented from turning by reason of the engagement of its lug 96 with a slot 88 and the retainer 100 is prevented from turning by reason of the engagement of its slots 108 with the projections 87 on the holder 80. Finally the engagement of the flanges 104 and 103 gently draws the retainer grips 102 against the gem and the rotation of the sleeve nut 105 is continued until the operator is satisfied that the pressure of the grips is sufficient to firmly hold the gem. The lock nut 107 is then rotated to contact with the sleeve nut 105 and the latter is thus firmly held in position.

Figure 2:
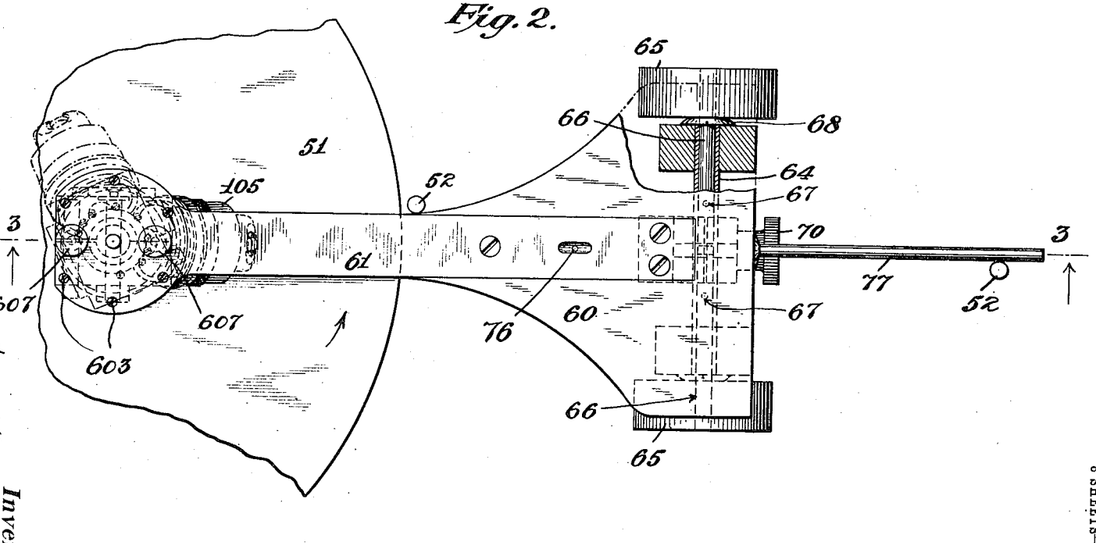
Fig. 2 is a top plan view of the parts shown in Fig. 1, some of the concealed parts being indicated in dotted outline.
Figure 3:
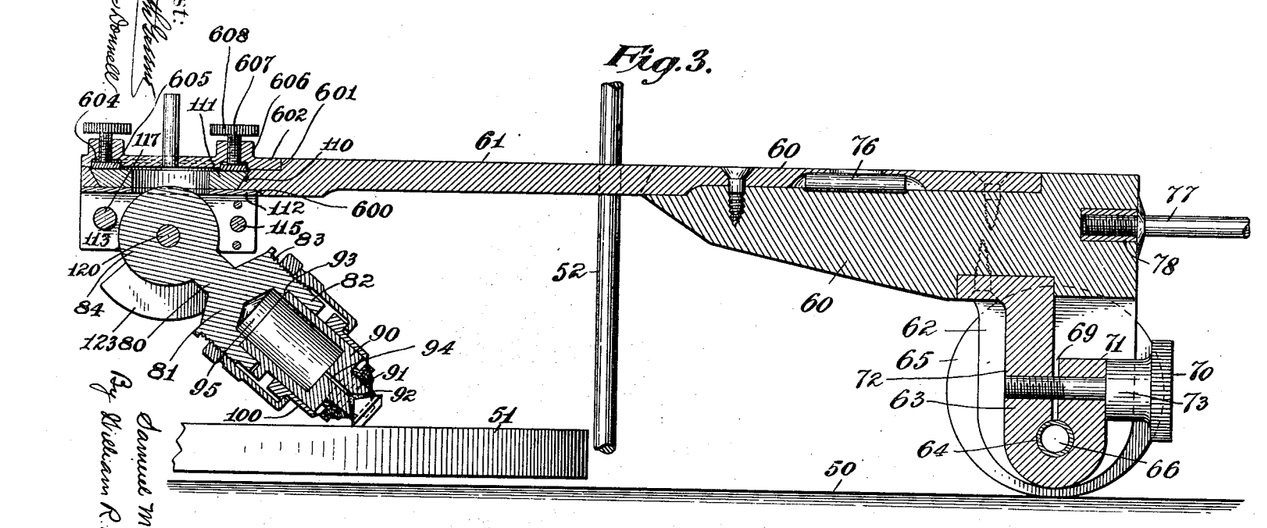
Fig. 3 is a central vertical section on the plane of the line 3—3 in Fig. 2 but on a slightly enlarged scale.
Figure 4:
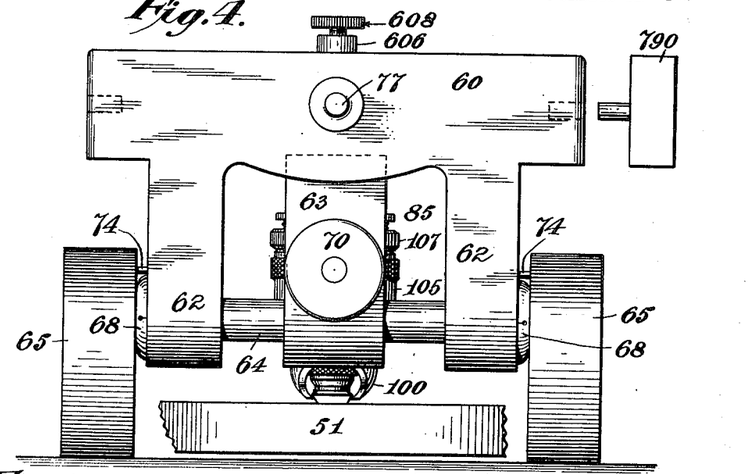
Fig. 4 is a rear elevation of the parts shown in Fig. 1 with the dop in a vertical position.
Figures 30, 32:
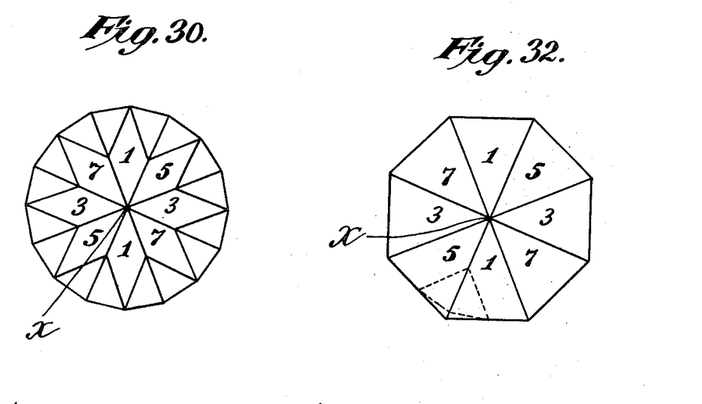

It will be noticed that by the arrangement described the movement of the grip is solely in the direction of the longitudinal axis of the pot, and as the retainer closely hugs the pot, and the pot cannot turn, there is no tendency to a torsional displacement of the gem during the operation. The purpose of this construction is to bring the grips firmly and evenly against the gem without cracking the cement in which the latter is set. It will also be noticed that the grips are so arranged that they do not touch the gem in dangerous proximity to any of its angular edges but that the lines of contact are at places where there is a sufficient thickness of material to prevent chipping or cleavage. The retainer is also so made that, when it is in position, it does not contact with the dop holder but there is an appreciable space between them so that there is no danger of injury to the gem by bringing these parts together even accidentally. The shaft 120 is then inserted through the blocks 113 and through the spherical head 84 of the pot holder and the nut 118 is threaded on the end of the shaft. (If the instrument has been previously used, the nut 118 will probably be on the end of the shaft 117. If it is already on the end of the shaft, the adjustment just described is of course omitted.) By means of the registering pin 125 the shaft 120 is held in a fixed relation to the blocks 113. The pot holder is then oscillated on the shaft 120 until the niche or graduation 86 registers with the zero (" 0 ") graduation on the scale 123 mounted on the end of the shaft. When so located the central longitudinal axes of the pot holder, the pot and the gem retainer are coincident and at right angles to the arm 61. The nut 118 is then tightened to hold the dop in the position into which it has been moved. The instrument is then placed in upright position on the bench 50 with the dop over the wheel 51 and is approximately leveled by rotating the disks 65 and watching the bubble in the level 76, and the wheel is started. The operator then takes hold of the arm 61 and allows the point of the gem to touch the wheel to ascertain the proper direction of the grain of the stone with respect to the wheel. This is a matter of judgment on the part of the operator. If the gem is not in the proper position, he loosens the screws 607 to permit the blocks 113 to turn slightly and then tightens the screws, and tests the gem on the wheel. If the proper grain is found he sets the instrument back upon the wheel, maintaining the arm 61 substantially in a radial line with the center of the wheel. If the proper grain is not found he makes another trial and keeps on making trials until he does find the proper position and when this is found he allows a plane surface to be cut on the gem, sets the instrument within the usual positioning posts 52 and accurately levels the instrument and if necessary places a weight on the carrier to assist in maintaining the contact of the gem with the wheel. As soon as the culet is polished he is ready to adjust the instrument to polish the prime facets " 1 " " 1 ". To do this, he loosens the nut 118 which permits the dop to swing on the shaft 120, and moves the dop until the niche 86 is opposite that one of the graduations 124 which corresponds to the angle at which the facet " 1 " is to be polished. What this angle shall be depends upon the size and weight of the gem and trade considerations well known to persons skilled in the art. Having moved the dop to the desired point the nut 118 is tightened. The arm 61 is then leveled by turning the disks 65 and the gem is brought into contact with the wheel 51 (see Figs. 1 and 3). If he finds that the grain of the gem is in the proper position with respect to the wheel he adjusts the instrument between the positioning posts 52 and if necessary places weights upon the arm 61. If he finds that the dop has to be moved to place the gem into the most advantageous position on the wheel for proper polishing he loosens the set screw 607 and turns the blocks 113 carefully until the proper position is found, when the screws 607 are tightened and the polishing operation continued, weights being used if necessary. Such a position of the dop is indicated in dotted outline in Fig. 2. When the dop is in such a position oblique to the axis of the arm 61 there is a tendency to cause the instrument to tilt. To counteract this tendency a weight of proper size is secured to the instrument on the side of the carrier 60. When the facet has been polished, the corresponding facet on the opposite side of the stone is then polished. To do this all that is necessary is to loosen the nut 118 and swing the dop through the zero point on the sector to a graduation corresponding to the one at which it has been set on the opposite side, so that both facets will have the same angle but in opposite directions. If the grain is in a proper relation to the wheel no further adjustment of the dop is required. If however the gem is not in proper position with relation to the wheel, the set screws 607 are loosened and the blocks 113 are turned until the proper position is found when these screws are tightened and the polishing operation continued, the arm 61 being leveled if required. It is to be noted that during the three operations of polishing the culet and two of the pavilion facets, the pot, the gem retainer and the gem have not been moved with respect to each other but have only been moved as a unit. During the step of finding the proper position of the gem with respect to the wheel in order to get the best position of its grain for polishing and the rotation of the blocks 113, the graduations 129 on the lower surface of the arm 61 serve to indicate the extent of such rotation, and this being noted, it is easy for the operator to reinstate the parts in their former position if for any reason they are disassembled. After the two facets " 1 " " 1 " are polished it is most convenient to polish the pair of facets at right angles thereto and which are designated " 3 " " 3 " in Fig. 32. To do this, the operator turns the instrument over, takes the sleeve nut 105 from the pot holder, removes the gem retainer from the pot, partly removes the pot until the lug 96 is out of engagement with the recess 88 on the pot holder which it will be remembered is marked "1" and rotates the pot until this lug 96 is opposite the recess 88 which is marked "3" when it is placed into engagement with said recess and the gem retainer is returned to the same position as before and the other parts are reassembled as before. This is all done without disturbing the position of the gem with respect to the pot or the gem retainer with respect to the pot holder. In other words, all that has been done is to rotate the pot to a position at right angles to the former polishing zone, and this without moving the angular position of the pot holder with respect to the blocks 113, because as all of the prime facets of the pavilion are at the same angle with the girdle and as they are polished in pairs, that one of the facets "3" is first polished which requires the dop to be on the same side of the zero mark on the scale 124 as the side at which it was placed when the second facet "1" was polished. After this pair of prime facets are polished, the pairs 5, 5 and 7, 7 are polished, all without disturbing the position of the gem with respect to the pot or the gem retainer with respect to the pot holder, but simply by moving the pot to a new circular position within the holder. This completes the polishing of the prime facets of the pavilion. The next operation is to form a series of intermediate facets which is done by truncating the angles between the prime facets commencing at a point midway the culet and the girdle and continuing inwardly toward the girdle as shown in dotted outlines in Fig. 32. After these facets are formed the angles between them and the prime facets are themselves truncated near the girdle to form sixteen secondary facets and thus finish the pavilion, as shown in Figs. 29 and 30. The intermediate facets are formed in pairs. To that end the pot is moved to cause its projection 96 to engage the recess marked "2" on the pot holder, which brings the angle between the facets 1 and 7 within the cutting zone. The parts are then secured together and the new intermediate facet is cut on one side of the pavilion, the dop of course being positioned at a more acute angle to the cutting plane as determined by the relation of the niche 86 to the scale 124. After this facet is polished, the pot holder is oscillated on the shaft 120 in the same vertical plane to permit of the polishing of the similar intermediate facet of the same pair on the opposite side. In a similar manner all of the intermediate facets are polished, the pot being moved to cause its lugs 96 to engage a new recess in the pot holder for each pair of facets. The intermediate facets are then cut away to permit of the formation of the secondary facets. To accomplish this the nut 118 is removed and the shaft 120 withdrawn. The nut 118 is then placed on the clamp shaft 117 thus forming the blocks 113 and head 84 into a universal joint. The reason for this is that so long as the pot holder can oscillate on the shaft 120 the facets cut are always in planes radiating from the culet at a center, and the intermediate planes the cutting of which has just been described also radiate from this same center, but the secondary facets are oblique to such center necessitating an oblique position of the dop. As the head 84 and blocks 113 form a universal joint the dop can be turned to any angular position in its holder. To cut such a secondary facet the dop is turned until the gem is in the proper position. This can readily be ascertained by the operator by the naked eye, or by the use of a glass if the gem is very small. When so turned, however, the gem retainer will be found not to grasp the gem at an equal distance from the center of the plane to be cut, but at a little to one side of such center. To position this accurately the nut lock 105 is removed and the gem retainer lifted from the pot holder and turned in the right direction until one of two slots 108* (placed one on each side of the slot 108) registers with the proper projection 87. It is then placed in engagement with the pot holder and the parts tightened and the polishing operation completed as before. As soon as this is accomplished the dop holder is turned to a proper position to cut the next one of the pair of secondary facets, the gem retainer being moved so that its other slot 108* engages the projection 87 on the dop holder. In a similar manner each pair of secondary facets are cut all the way around the pavilion.

It may be that the secondary facets can be cut by truncating the intermediate facets in a plane which is radial to a center in the longitudinal axis of the pot holder and pot. In such case the universal joint is not employed but the pot holder is retained on the shaft 120, the lug 96 on the pot being moved to a position to engage a slot situated between the slots which govern the position of the cutting zones of the intermediate plane.

Figure 28:
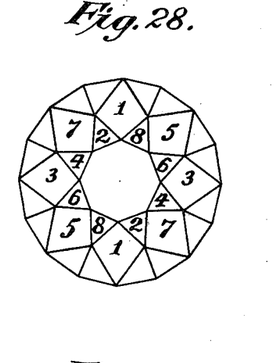
Fig. 28 is a plan of a diamond or other gem showing a brilliant cut.
Figure 31:
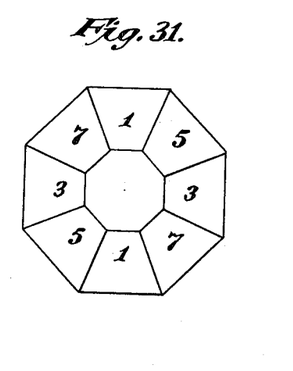
Fig. 31 is a plan view and Fig. 32 a bottom view of a gem cut "eight square" with the prime facets before the intermediate or secondary facets are produced.
Figure 33:
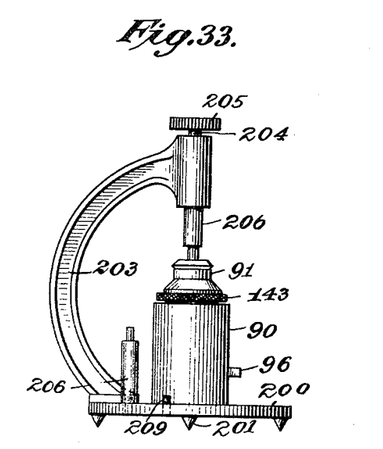
Fig. 33 is a side elevation of the device for placing the gem in the pot.

To cut the bezel facets between the table and girdle, the table is first polished just as the culet was polished, then a series of prime facets are cut in pairs, these are designated "1" "1", "3" "3", "5" "5" and "7" "7" in Figs. 28 and 31. Then the adjustment of the dop holder is changed and the "star" facets "2" "2", "4" "4", "6" "6" and "8" "8" are polished in pairs, then a series of intermediate facets (indicated in dotted lines in Fig. 31) are truncated from the odd numbered prime facets and these in turn are truncated to form secondary facets in the same manner as the secondary facets were formed when making the pavilion facets. Of course it will be understood that the slots 88 are so positioned as to control the circular position of these facets, and the angles of the longitudinal axis of the dop with the wheel are varied as required.

It is important to note that the cement upon which the gem is mounted in the terminal recess of the pot is not a cushion and does not have the function of a cushion, but is for the purpose of providing a means for retaining the relative position of the gem with respect to the sides of the pot while the polishing operation is going on, that is, it serves the purpose of maintaining this relation although the pot may be circularly moved within its holder and the gem retainer may be circularly moved with respect to the pot and the latter may be longitudinally moved parallel with the axis of the pot before it is circularly adjusted to a new position. It should also be noted that the grips of the gem retainer contact with the gem in the plane or planes at right angles to the longitudinal axis of the pot and further that the gem retainer closely embraces the sides of the pot which are cylindrical and therefore parallel to such longitudinal axis so that the gem retainer can only be moved away from and toward the gem in lines parallel to the longitudinal axis of the pot and at right angles to the plane or planes of contact between its grip and the gem. The result is that the gem is held squarely and firmly in such a position that the middle is in a plane at right angles to the longitudinal axis of the pot and remains there and as the grips of the gem retainer are symmetrically placed with respect to the longitudinal axis of the pot, the pressure on all sides of the gem exerted by the retainer is equal and consequently there is no tendency on the part of the gem to tilt, twist or turn.

What I claim is:—

1. A dop having a pot holder, a pot, means for holding the pot against rotation in the holder, means for securing the pot in the holder against longitudinal movement with relation to the pot.

2. A dop having a pot holder, a pot, means for holding the pot against rotation in the holder, a gem retainer coöperating with the pot and means for simultaneously holding both the retainer and pot in operation to the holder.

3. A dop having a pot holder, a pot, means for holding the pot against rotation and means for holding the pot against longitudinal movement, a gem retainer, a gem ejector and means to move the ejector longitudinally.

4. A dop having a pot holder, a pot seated in said holder and having a projecting neck, a gem retainer in sliding relation to the pot, a gem ejector movable longitudinally of the neck and means for holding the retainer and pot to the holder.

5. A dop having a pot holder, a pot seated in the holder, and a gem retainer embracing the pot and means for simultaneously holding the retainer and pot to the holders.

6. A dop comprising a hollow pot provided with a projecting neck having a cement receiving terminal recess, and a conduit leading from such recess to the interior of the pot.

7. A dop comprising a hollow pot provided with a projecting neck having a cement receiving terminal recess, and a conduit leading from such recess to the interior of the pot in combination with a gem retainer comprising sleeves adapted to embrace the pot.

8. The combination with a pot, of a gem retainer comprising grips and means for longitudinally adjusting the retainer along the pot without torsional movement.

9. The combination with a pot, of a gem retainer comprising grips and means for longitudinally adjusting the retainer along the pot without torsional movement consisting of a registering pin and slot and a rotatable nut surrounding the retainer.

10. A dop comprising a pot provided with a cement holding recess to receive and hold the gem and a retainer adapted to embrace the opposite side of the stone away from its angular edges, and means for circularly positioning the pot and retainer at predetermined points and means for locking the retainer into position.

11. A dop comprising a pot provided with a cement holding recess to receive and hold the gem and a retainer adapted to embrace the opposite side of the stone away from its angular edges, and means for circularly positioning the pot and retainer at predetermined points and means for locking the retainer into position consisting of a sleeve nut and lock nut.

12. A dop comprising a pot provided with a cement holding recess to receive and hold the gem and a retainer adapted to embrace the opposite side of the stone away from its angular edges and means for longitudinally moving the retainer with respect to the pot without disturbing the position of the gem and means for locking the retainer into position consisting of a sleeve nut and lock nut.

13. In a device of the character described, a hollow pot holder, a hollow pot adapted to be seated therein, a neck projecting from the pot, a retainer adapted to surround the pot and having grips extending inwardly beyond its neck and a locking sleeve adapted to embrace the retainer and threaded to move on the pot holder in combination with a lock nut also threaded on the pot holder and adapted to be moved against the locking sleeve and means for limiting the movement of the lock nut.

14. In a device of the character described, a hollow pot holder, a hollow pot adapted to be seated therein, a neck projecting from the pot, a retainer adapted to surround the pot and having grips extending inwardly beyond its neck and a locking sleeve adapted to embrace the retainer and threaded to move on the pot holder in combination with a lock nut also threaded on the pot holder and adapted to be moved against the locking sleeve and means for limiting the movement of the lock nut consisting of a projecting member on the pot holder.

15. In a device of the character described, a hollow pot holder, a hollow pot adapted to be seated therein, a neck projecting from the pot, a retainer adapted to surround the pot and having grips extending inwardly beyond its neck and provided with an annular flange and a locking sleeve having an inwardly projecting annular flange adapted to engage the flange of the retainer and which locking sleeve is threaded on the retainer in combination with a lock nut also threaded on the pot holder and adapted to be moved against the locking sleeve and means for limiting the movement of the lock nut.

16. In a device of the character described, a hollow pot holder, a hollow pot adapted to be seated therein, a neck projecting from the pot, a retainer adapted to surround the pot and having grips extending inwardly beyond its neck and provided with an annular flange and a locking sleeve having an inwardly projecting annular flange adapted to engage the flange of the retainer and which locking sleeve is threaded on the retainer in combination with a lock nut also threaded on the pot holder and adapted to be moved against the locking sleeve and means for limiting the movement of the lock nut consisting of a projecting member on the pot holder.

17. In a device of the character described, the combination with a pot of a gem ejector comprising a sleeve adapted to encircle the pot behind the gem and means for moving the sleeve longitudinally with respect to the pot.

18. In a device of the character described, the combination with a pot of a gem ejector comprising a sleeve adapted to encircle the pot behind the gem and means for moving the sleeve longitudinally with respect to the pot consisting of a carrier for the sleeve threaded on the pot.

19. In a device of the character described, the combination with a pot of a gem ejector comprising a sleeve adapted to encircle the pot behind the gem and provided with beveled sides to form a fine edge surrounding the pot.

20. In a device of the character described, the combination with a pot of a gem ejector comprising a sleeve adapted to encircle the pot behind the gem and provided with beveled sides to form a fine edge surrounding the pot and means for moving the sleeve along the pot to contact with the stone.

21. A pot provided with means for cementing a stone therein so that its edges project beyond the surface of the pot, in combination with a gem ejector comprising a movable piece adapted to be moved along the pot to contact with the stone and force it out of the cement.

22. In a device of the character described, the combination with a pot of a gem ejector comprising a sleeve adapted to encircle the pot behind the gem and means for moving the sleeve longitudinally with respect to the pot consisting of a carrier for the sleeve threaded on the pot and locking it into position.

23. A pot externally threaded, a nut threaded thereon, an ejecting sleeve having a fine inner edge adapted to embrace the pot and carried by the nut.

24. A pot externally threaded, a nut threaded thereon, an ejecting sleeve having a fine inner edge adapted to embrace the pot and carried by the nut and means for locking the nut and sleeve together.

25. The combination with a pot having a cement receiving recess and an external retaining device, of an intermediate ejector.

26. The combination with a pot having a cement receiving recess of an external retaining device, an intermediate ejector and means for moving it along the pot.

27. In combination, a dop carrier, means for adjusting it in a horizontal position, a dop, means for adjusting it circularly in a plane parallel to the carrier and means for adjusting it circularly in a plane at right angles to the carrier, the shaft being removable to allow the universal joint to become operative.

28. The combination with a dop and its carrier, of an intermediate universal joint; and an intermediate shaft adapted to permit the dop to move only in a vertical plane and means whereby it may be circularly moved after either of such adjustments have been made.

29. The combination of a dop carrier and dop holder, of means for moving the holder circularly parallel to the carrier and radially in a plane at right angles thereto and locking it into any desired position within such range of movement consisting of a recess in the carrier, a plate adapted to be rotated therein and means for holding the plate at any point.

30. The combination of a dop carrier and dop holder, of means for moving the holder circularly parallel to the carrier and radially in a plane at right angles thereto and locking it into any desired position within such range of movement consisting of a recess in the carrier, a plate adapted to be rotated therein and means for holding the plate at any point, including set screws.

31. The combination of a dop carrier and dop holder, of means for moving the holder circularly parallel to the carrier and radially in a plane at right angles thereto and locking it into any desired position within such range of movement consisting of a recess in the carrier, a plate adapted to be rotated therein and means for holding the plate at any point and a connection between the plate and the dop holder.

32. A dop carrier, a dop holder having a rounded head and an intermediate connection between permitting of a variety of movements of the dop holder comprising a rotatable piece secured to the carrier and clamps secured to such member and adapted to embrace the rounded head of the dop holder in combination with means for locking the rotatable piece at any position, including set screws on the carrier.

33. A dop carrier, a dop holder having a rounded head and an intermediate connection between permitting of a variety of movements of the dop holder comprising a rotatable piece secured to the carrier and clamps secured to such member and adapted to embrace the rounded head of the dop holder in combination with means for locking the rotatable piece at any position and means for locking the clamps to hold the rounded head of the dop holder in any position.

34. A dop carrier, a dop holder having a rounded head and an intermediate connection between permitting of a variety of movements of the dop holder comprising a rotatable piece secured to the carrier and clamps secured to such member and adapted to embrace the rounded head of the dop holder in combination with means for locking the rotatable piece at any position and means for locking the clamps to hold the rounded head of the dop holder in any position including a set screw passing through the clamps.

35. A dop carrier, a dop holder having a rounded head and an intermediate connection between permitting of a variety of movements of the dop holder comprising a rotatable piece secured to the carrier and clamps secured to such member and adapted to embrace the rounded head of the dop holder in combination with means for locking the rotatable piece at any position and means for locking the clamps to hold the rounded head of the dop holder in any position including a set screw passing through the clamps and further means for locking the shaft and rounded head together.

36. The combination with a pot, of a gem retainer comprising grips and means for longitudinally adjusting the retainer along the pot without torsional movement consisting of coöperating longitudinally registering devices on the pot and retainer.

37. The combination with a pot, of a gem retainer comprising grips and means for longitudinally adjusting the retainer along the pot without torsional movement consisting of coöperating longitudinally registering devices on the pot and retainer and means for securing the parts in place after adjustment.

38. The combination with a pot having a gem receiving recess, of means for preventing the gem from movement after insertion.

39. The combination with a pot having a gem receiving recess, of means for preventing the gem from movement after insertion comprising a retainer adapted to grasp the gem and means for preventing any tilting or twisting of the retainer.

40. The combination with a pot having a gem receiving recess, of means for preventing the gem from rotary movement after insertion comprising a retainer adapted to grasp the gem and means for preventing any tilting or twisting of the retainer including registering devices in lines with the longitudinal axis of the retainer.

41. In combination, a dop pot, and means for securing a gem therein, comprising a positioner for the pot and a presser rod having means for engaging the gem to move it against the pot.

42. In a device of the character described, the combination with a pot of a gem retainer adapted to contact with the gem in a plane or planes substantially at right angles with the longitudinal axis of the pot, means for confining the movement of the retainer to and from the gem to a direction parallel with such axis and means for locking the retainer in position when it contacts with the gem.

43. In a device of the character described, the combination with a pot of a gem retainer mounted in slidable contact with the pot and provided with grips adapted to contact with the gem in a plane or planes at right angles to the longitudinal axis of the pot and which retainer is provided with guides confining its movement to and from the gem to lines parallel with such longitudinal axis.

44. In a device of the character described, the combination with a pot of a gem retainer mounted in slidable contact with the pot and provided with grips adapted to contact with the gem in a plane or planes at right angles to the longitudinal axis of the pot and which grips are symmetrically arranged with respect to said axis and which retainer is provided with guides confining its movement to and from the gem to lines parallel with such longitudinal axis.

In testimony whereof I affix my signature in presence of two witnesses.

SAMUEL M. SCHENKEIN.

Witnesses:
E. W. SCHERR, Jr.,
ALAN C. McDONNELL.